(12) United States Patent
Chen et al.

US008020090B2

(10) Patent No.: US 8,020,090 B2
(45) Date of Patent: Sep. 13, 2011

(54) SMALL FORM FACTOR WEB BROWSING

(75) Inventors: Yu Chen, Beijing (CN); Wei-Ying Ma, Beijing (CN); Ming-Yu Wang, Beijing (CN); Hong Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1166 days.

(21) Appl. No.: 11/465,736

(22) Filed: Aug. 18, 2006

(65) Prior Publication Data

US 2006/0282445 A1 Dec. 14, 2006

Related U.S. Application Data

(63) Continuation of application No. 10/306,729, filed on Nov. 27, 2002, now Pat. No. 7,203,901.

(51) Int. Cl.
*G06F 17/00* (2006.01)
(52) U.S. Cl. ........ 715/238; 715/204; 715/208; 715/240; 715/243; 715/788
(58) Field of Classification Search .................. 715/238, 715/240, 243, 246, 247, 252, 204, 234, 236, 715/208, 788
See application file for complete search history.

(56) References Cited

U.S. PATENT DOCUMENTS

| | | | |
|---|---|---|---|
| 5,537,526 A | 7/1996 | Anderson et al. |
| 5,704,029 A | 12/1997 | Wright |
| 5,893,127 A | 4/1999 | Tyan et al. |
| 6,023,714 A | 2/2000 | Hill et al. |
| 6,167,409 A | 12/2000 | DeRose et al. |
| 6,230,174 B1 | 5/2001 | Berger et al. |
| 6,300,947 B1 | 10/2001 | Kanevsky |
| 6,345,279 B1 | 2/2002 | Li et al. |
| 6,542,925 B2 | 4/2003 | Brown et al. |
| 6,546,406 B1 | 4/2003 | DeRose et al. |
| 6,556,217 B1 | 4/2003 | Makipaa et al. |
| 6,564,263 B1 | 5/2003 | Bergman et al. |
| 6,573,907 B1 | 6/2003 | Madrane |
| 6,680,976 B1 | 1/2004 | Chen et al. |
| 6,785,676 B2 | 8/2004 | Oblinger |
| 6,876,625 B1 | 4/2005 | McAllister et al. |
| 6,876,628 B2 | 4/2005 | Howard et al. |

(Continued)

OTHER PUBLICATIONS

"Abstraction" retrieved on Jan. 30, 2007, at <<http://www.webopedia.com/TERM/a/abstraction.html>>, Jupitermedia Corporation, 2007, pp. 1-2.

(Continued)

*Primary Examiner* — Stephen S Hong
*Assistant Examiner* — Matthew J Ludwig
(74) *Attorney, Agent, or Firm* — Lee & Hayes, PLLC

(57) ABSTRACT

A large web page is analyzed and partitioned into smaller sub-pages so that a user can navigate the web page on a small form factor device. The user can browse the sub-pages to find and read information in the content of the large web page. The partitioning can be performed at a web server, an edge server, at the small form factor device, or can be distributed across one or more such devices. The analysis leverages design habits of a web page author to extract a representation structure of an authored web page. The extracted representation structure includes high level structure using several markup language tag selection rules and low level structure using visual boundary detection in which visual units of the low level structure are provided by clustering markup language tags. User viewing habits can be learned to display favorite parts of a web page.

9 Claims, 8 Drawing Sheets

U.S. PATENT DOCUMENTS

| | | | |
|---|---|---|---|
| 6,898,800 | B2 | 5/2005 | Son et al. |
| 7,051,276 | B1 | 5/2006 | Mogilevsky et al. |
| 7,093,001 | B2 | 8/2006 | Yang et al. |
| 7,093,011 | B2 | 8/2006 | Hirata et al. |
| 7,225,397 | B2 * | 5/2007 | Fukuda et al. ............ 715/230 |
| 7,246,306 | B2 | 7/2007 | Chen et al. |
| 7,278,098 | B1 | 10/2007 | Boye et al. |
| 7,599,983 | B2 * | 10/2009 | Harper et al. ............ 709/200 |
| 2001/0054049 | A1 | 12/2001 | Maeda et al. |
| 2002/0016801 | A1 * | 2/2002 | Reiley et al. ............ 707/523 |
| 2002/0099829 | A1 | 7/2002 | Richards et al. |
| 2002/0143821 | A1 | 10/2002 | Jakubowski |
| 2002/0156807 | A1 | 10/2002 | Dieberger |
| 2003/0005159 | A1 | 1/2003 | Kumhyr |
| 2003/0014442 | A1 | 1/2003 | Shiigi et al. |
| 2003/0037076 | A1 | 2/2003 | Bravery et al. |
| 2003/0095135 | A1 | 5/2003 | Kaasila et al. |
| 2003/0101203 | A1 | 5/2003 | Chen et al. |
| 2003/0217117 | A1 | 11/2003 | Dan et al. |
| 2004/0085341 | A1 | 5/2004 | Hua et al. |
| 2004/0086046 | A1 | 5/2004 | Ma et al. |
| 2004/0088726 | A1 | 5/2004 | Ma et al. |
| 2004/0172484 | A1 | 9/2004 | Hafsteinsson et al. |
| 2004/0187080 | A1 | 9/2004 | Brooke et al. |
| 2005/0108637 | A1 | 5/2005 | Sahota et al. |
| 2005/0114434 | A1 | 5/2005 | Yang et al. |
| 2006/0129671 | A1 | 6/2006 | Yang et al. |
| 2007/0089053 | A1 | 4/2007 | Uhlig et al. |
| 2007/0156677 | A1 | 7/2007 | Szabo |

OTHER PUBLICATIONS

Breslauer, et al., "A Lower Bound for Parallel String Matching", Annual ACM Symposium on Theory of Computing, 1991, pp. 439-443.

Karkkainen, et al., "Two and Higher Dimensional Pattern Matching in Optimal Expected Time", SODA '94: Proceedings of the fifth annual ACM-SIAM symposium on Discrete algorithms, 1994, pp. 715-723.

Navarro, "A Guided Tour to Approximate String Matching", ACM Computing Surveys, vol. 33, No. 1, Mar. 2001, pp. 31-88.

Smith, et al., "Scalable Multimedia Delivery for Pervasive Computing", ACM, Multimedia 99, 1999, pp. 131-140.

Abdelzaher, et al., "Web Server QoS Management by Adaptive Content Delivery", Hewlett Packard, Dec. 1999, pp. 1-11.

Mohapatra, et al., "A Framework for Managing QoS and Improving Performance of Dynamic Web Content", GlobeComm (Global Telecommunication Conference), IEEE, Nov. 2001, pp. 1-5.

Cai et al, "Extracting Content Structure for Web Pages based on Visual Representation", ACM Transactions on Info. Sys., vol. 20, No. 1, Jan. 2002.

Chen, Jinlin et al., "Function-based Object Model Towards Website Adaptation," (2001) Proc. of the 10th Int. WWW Conf. pp. 1-21.

Christopoulos, Charilaos et al., "The JPEG2000 Still Image Coding System: An Overview," IEEE Transactions on Consumer Electronics, vol. 46, No. 4, pp. 1103-1127, Nov. 2000.

Itti, et al., "A Comparison of Feature Combination Strategies for Saliency-Based Visual Attention Systems," Proc. of SPIE Human Vision and Electronic Imaging IV (HVEI'99), San Jose, CA, vol. 3644, 10 pages, Jan. 1999.

Itti at al., "A Model of Saliency-based Visual Attention for Rapid Scene Analysis", IEEE Trans. on Pattern Analysis and Machine Intelligence, 1998, 5 pages.

Itti, at al., "Computational Modeling of Visual Attention," Nature Reviews/Neuroscience, Bol. 2, Mar. 2001, pp. 1-11.

Lee, et al., "Perception-Based Image Transcoding for Universal Multimedia Access," School of Electrical Engineering Korea University, Seoul, Korea, 2001 IEEE, pp. 475-478.

Lin, at al., "Video Scene Extraction by Force Competition," IEEE Intl. Conference on Multimedia and Expo (ICME 001), Waseda University, Tokyo, Japan, Aug. 22-25, 2001, 7 pages.

Ma et al., A Framework for Adaptive Content Delivery in Heterogeneous Network Enviomments, Jan. 2000, SPIE vol. 3969, Proceedings of MMCN00, San Jose, USA.

Ma, at al., "A Model of Motion Attention for Video Skimming," Microsoft Research Asia, 4 pages.

Ma, et al., "A New Perceived Motion Based Shot Content Representation", Microsoft Research China, 4 pages.

O'Toole, et al., "Evaluation of Automatic Shot Boundary Detection on a Large Video Test Suite," School of Computer Applications and School of Electronic Engineering, Dublin City University, Glasnevin, Dublin, Ireland, Challenge of Image Retrieval, Newcastle, 1999, pp. 1-12.

"Refreshable Braille Displays", Mar. 11, 2000, retrieved from the Internet Oct. 26, 2005:http//web.archive.org/web/200000311151437/http://www.deafblind.com/display.html], pp. 1-2.

"Schema Objects", Chapter 10, Oracle 8i Concepts, Release 8.15, 1999.

Smith, et al., "Video Skimming and Characterization through the Combination of Image and Language Understanding Techniques," Proce. of Computer Vision and Pattern Recognition, 1997 IEEE, pp. 775-781.

"Visually Impaired," Aug. 22, 2002, retrieved from the Internet Oct. 26, 2005:[http://web.archive.org/web/20020822193408/http://linusdocs.org/HOWTOs/Access-HOWTO-3.html], pp. 1-6.

Zhang, Adaptive Content Delivery: A New Application Area for Media Computing Research, Jan. 2000, Available at http://research.microsoft.com/china/papers/Adaptive_Content_Delivery.pdf.

Bickmore et al., "Digestor: device-independent access to the World Wide Web", 1997, Computer Networks and ISDB Systems 29, pp. 1-8.

Chen et al., "Detecting Web Page Structure for Adaptive Viewing on Small Form Factor Devices", WWW' 2003, May 20-24, 2003, Budapest, Hungary, ACM, pp. 1-9.

Manola, "Towards a Web Object Model", Object Services and Consulting, Inc., at<<http://www.objs.com/OSA/wom.htm>>, Feb. 10, 1998, 60 pgs.

* cited by examiner

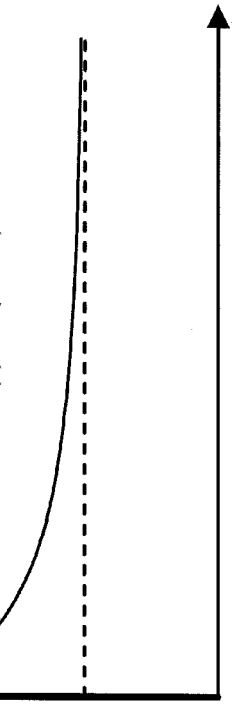
Fig. 3: Header/Footer Detection
$N = \text{base\_threshold} + F(\text{Height/Width})$, where
$F(x) = a/(b*x+c)$
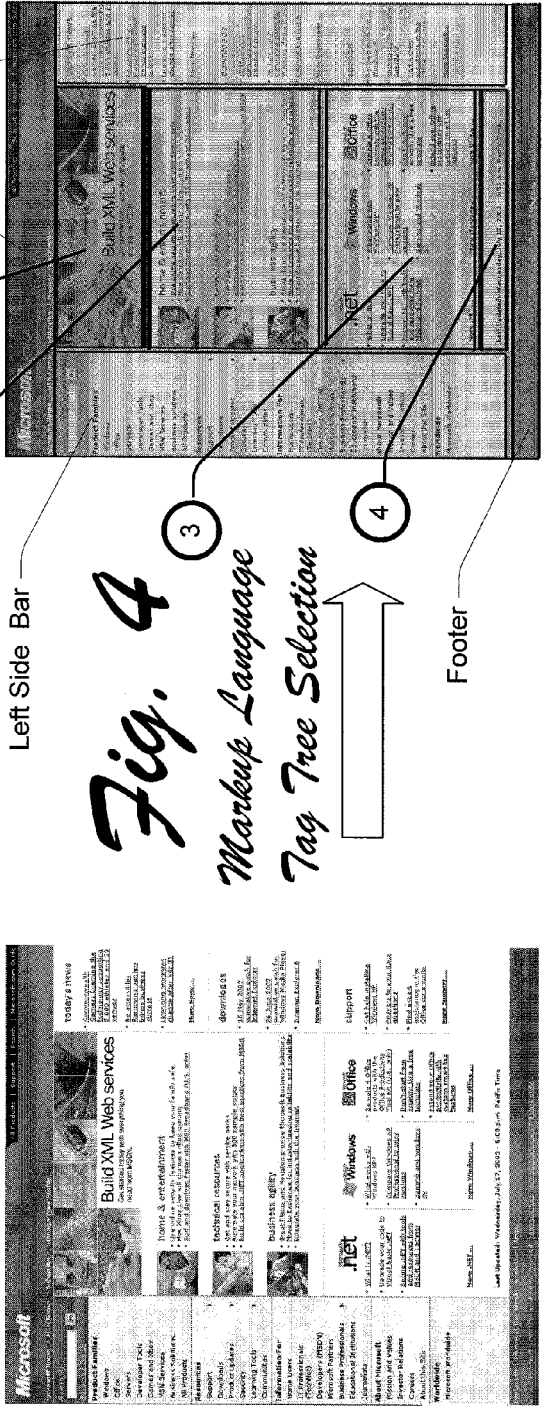
Fig. 4
Markup Language
Tag Tree Selection

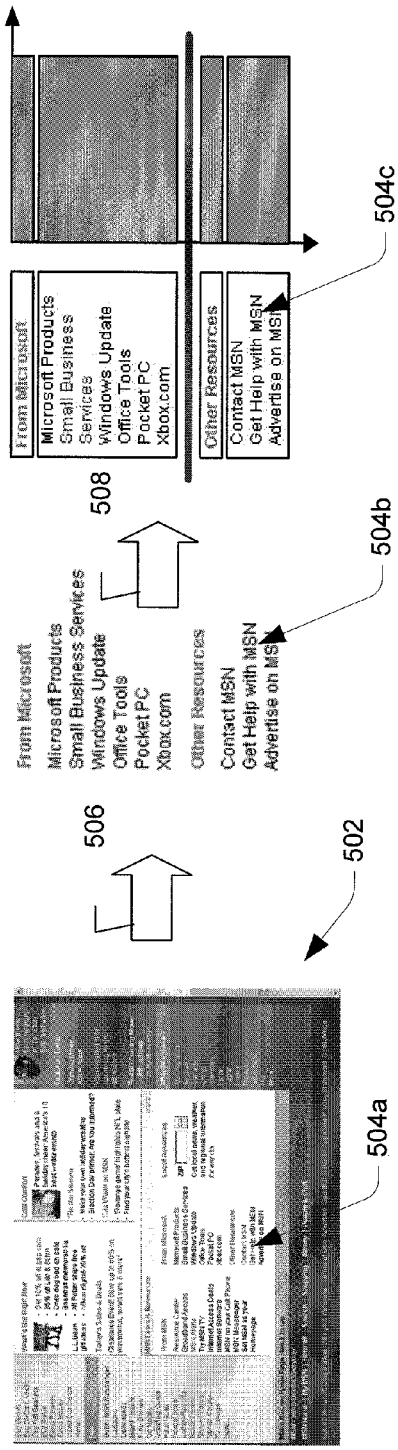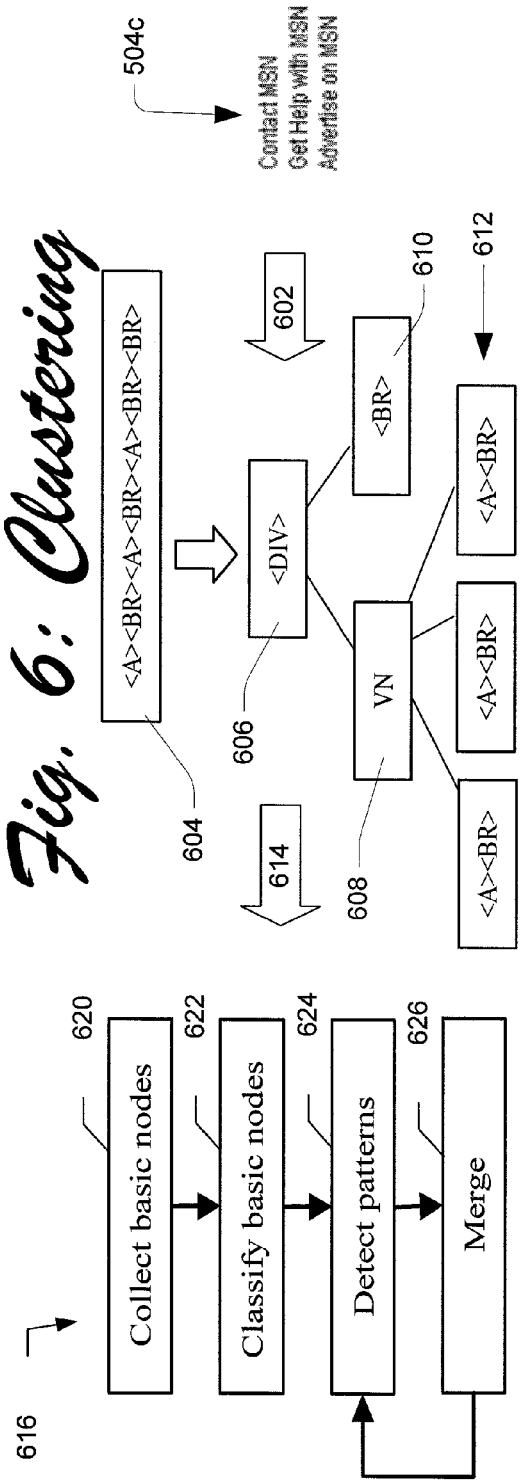

Fig. 9: Auto Positioning

Index Page

SMALL FORM FACTOR WEB BROWSING

RELATED APPLICATIONS

This Patent is a Continuation of and claims benefit under 35 U.S.C. §120 to U.S. patent application Ser. No. 10/306,729, filed on Nov. 27, 2002 (hereinafter, the Parent). In turn, the Parent is related to U.S. patent application Ser. No. 10/177,803, filed on Jun. 21, 2002, titled "Web Information Presentation Structure For Web Page Authoring", which is incorporated herein in its entirety by reference (hereinafter, the First Citation). The Parent is also related to U.S. patent application Ser. No. 10/179,161, filed on Jun. 24, 2002, titled "Function-based Object Model for Web Page Display in a Mobile Device", which is incorporated herein in its entirety by reference (hereinafter, the Second Citation). The Parent is also related to U.S. patent application Ser. No. 09/995,499, filed on Nov. 26, 2001, titled "Methods and Systems for Adaptive Delivery of Multimedia Contents", which is incorporated herein in its entirety by reference, and is hereinafter referred to as the "Related Patent" (hereinafter, the Third Citation). The Parent is also related to U.S. patent application Ser. No. 09/893,335, filed on Jun. 26, 2001, titled "Function-based Object Model for Use in WebSite Adaptation", which is incorporated herein in its entirety by reference, and is hereinafter referred to as the "Related Patent" (hereinafter, the Fourth Citation).

TECHNICAL FIELD

This invention relates to adapting and rendering a web page for a small form factor device.

BACKGROUND

The Internet can be browsed by small Internet devices such as handheld computers, personal digital assistants (PDAs) and smart phones. These small form factor devices have been used to leverage the capabilities of the Internet and provide users ubiquitous access to information. Despite the proliferation of these devices, their usage for accessing today's Internet is still largely constrained by their small form factors, particularly their small screen size and their limited input capabilities. Most of today's web content has been designed with desktop computers in mind. Web content is often contained in large web pages which do not fit into the small screens of these small form factor devices. The web browsing in such devices is like seeing a mountain in a distance from a telescope, where the user is required to manually scroll the window to find and position the view correctly for reading information. This tedious and time-consuming browsing procedure has largely limited the usefulness of small form factor devices. Thus, browsing a typical web page with these devices can be an unpleasant experience.

To improve the browsing experience with a small form factor device, a web page can be adapted by techniques that modify the web content to meet both the client and the network capabilities. For instance, web objects on a web page can be distilled to decrease the network and client consumption, typically by discarding format information which tends to detract from the designed aesthetics of the web page. A large web page can also be re-authored into its defined sections and section headers, but there are few such specifications in typical web pages.

It is desirable to adapt a large web page for a small form factor device such that the adaptation is fully automatic, the whole web page is taken into consideration, and the resultant adapted page will be useable for most purposes. Additionally, it is desirable that the adaptation will leverage the web page authors' designing habits, preserve the visual impression of the original web page, and provide an effective way to express and realize presentation design.

Accordingly, this invention arose out of concerns associated with providing improved web page adaptation and re-authoring for small form factor devices.

SUMMARY

In accordance with the described embodiments, web content is translated from web content originally created for a large form factor device (e.g. a desktop computer) so that it can be viewed on a small form factor device (e.g. a palm top computer). The translation analyzes the web content of a large web page, partitions the content of the large web page into different sub-pages, learns user viewing habits or user-inputted preferences, and displays the appropriate sub-pages based on such learning or user-inputted preferences. By partitioning a large web page into sub-pages, a user can navigate the web page on a small screen of a small form factor device. The sub-pages are ranked by importance according to an analysis of the content and according to the user's preferences and needs. The user can jump between sub-pages to find and read information in the content of the large web page. The partitioning can be performed at a web server, an edge server, at the small form factor client, or can be distributed across one or more such devices. Implementations include web page analysis that leverages design habits of web page authors to extract a representation structure of a web page. The web page analysis include extracting high level structure using several markup language tag selection rules and then extracting low level structure by visual boundary detection in which visual units of the low level structure are provided by clustering the leaf markup language tags.

BRIEF DESCRIPTION OF THE DRAWINGS

A more complete understanding of the various methods, apparatuses, computer programs, and systems of the present invention may be had by reference to the following detailed description when taken in conjunction with the accompanying drawings wherein:

FIG. 3 is a graph useful in an implementation for providing a dynamic threshold for the determination of a header and/or a footer for a web page.

FIG. 4 shows the result of an implementation in which a markup language tag tree selection process is performed upon a web page so as to partition the web page into regions, including one header, one footer, one left side, one right side, and four body regions.

FIG. 5 shows the result of an implementation in which a visual boundary detection process is performed upon a region of a fragment of a web page that includes a plurality of blocks each of which is projected on to an axis in order to detect visual boundaries in the region of the web page.

FIG. 6 shows a sequence of illustrations with respect to the regions of the fragment of the web page seen in FIG. 5 that is subjected to a clustering process based upon its markup language tree tag sequence, and in which groups of nodes are formed in order to determine visual units for detecting boundaries for the region of the fragment of the web page.

DETAILED DESCRIPTION

Figure 1:
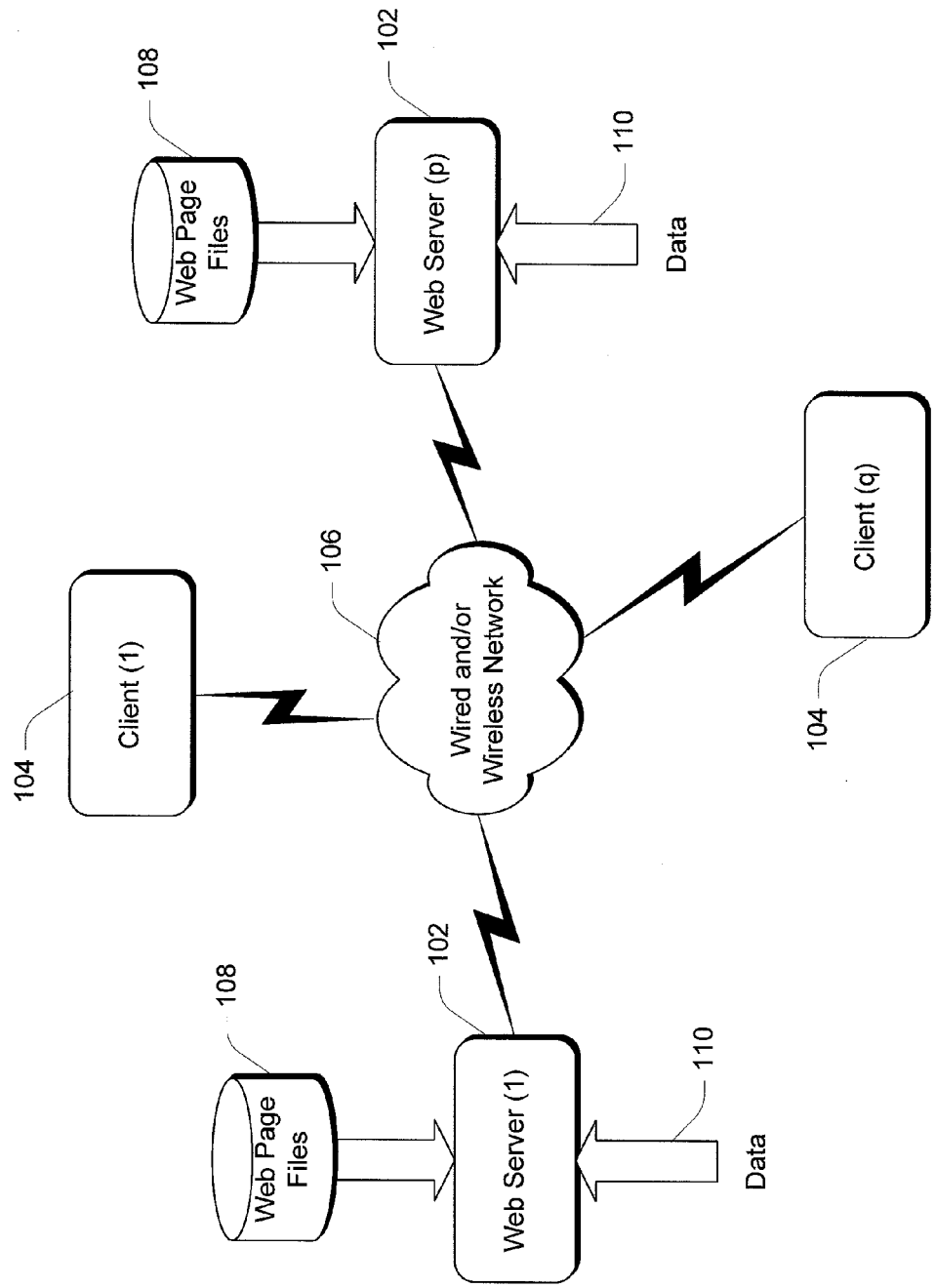
FIG. 1 is a block diagram, in accordance with an implementation of the present invention, of a networked client/server system.

Overview of Page Analysis and Presentation For Small Form Factor Devices

This patent presents a web page adaptation method of page partitioning for browsing on a small form factor device. The web page adaptation method includes processes for analyzing a web page to obtain its structure and then splitting up the web page. In the analysis process, a hierarchy of regions is created to represent the semantic and visual structure of the web page. According to this hierarchy, and the screen size of the small form factor device, appropriate blocks are selected as sub-pages.

After sub-page generation, an image index page is created to assist a user in navigating the web page. The image index page is marked with sub-pages, each of which is made up of one of more of the regions. When browsing, the user will first view a thumbnail rendering of the image index page. Then, in a bi-level browsing convention, the user can click on one of the marked sub-pages on the thumbnail of the image index page to go to the desired sub-page. Alternatively, the user's historical browsing habits for the web and for particular web pages can be analyzed to prioritize the first sub-page that the user will see when requesting a web page.

Turning to the drawings, wherein like reference numerals refer to like elements, implementations of the invention are illustrated in a general network environment. Although not required, implementations are described in the general context of computer-executable instructions, such as program modules, being executed by a computer or like device, which, for example, may take the form of a personal computer (PC), a workstation, a portable computer, a server, a plurality of processors, a mainframe computer, a wireless communications base station, and small form factor devices such as hand-held communications devices (e.g. a cellular telephone, a palm top computer, a streamed media player, a set-top box, etc.).

General Network Structure

FIG. 1 shows a client/server network system and environment, in accordance with an implementation, for transreceiving data over wired or wireless IP channels and networks. Generally, the system includes one or more p) network server computers 102, and one or more (q) network client computers 104. The computers communicate with each other over a data communications network, which in FIG. 1 includes a wired and/or wireless network 106. The data communications network might also include the Internet or local-area networks and private wide-area networks. Network server computers 102 and network client computers 104 communicate with one another via any of a wide variety of known protocols, such as the Transmission Control Protocol (TCP) or User Datagram Protocol (UDP). Each of the p network server computers 102 and the q network client computers 104 can include a codec for performing coding and decoding for data that is respectively transmitted and received.

Network server computers 102 have access to data including streaming media content in the form of different media streams. These media streams can be individual media streams (e.g., audio, video, graphical, etc.), or alternatively composite media streams including multiple such individual streams. Some of the data can be stored as files 108 in a database or other file storage system, while other data 110 might be supplied to the network server computer 102 on a "live" basis from other data source components through dedicated communications channels or through the Internet itself. The data received from network server computers 102 are rendered at the network client computers 104.

As shown in FIG. 1, the network system in accordance with an implementation of the invention includes network server computer(s) 102 from which a plurality of media streams are available. In some cases, the media streams are actually stored by network server computer(s) 102. In other cases, network server computers) 102 obtain the media streams from other network sources or devices. The system also includes network client computer(s) 104. Generally, the network client computer(s) 104 are responsive to user input to request media streams corresponding to selected content. In response to a request for a media stream corresponding to the content, network server computer(s) 102 streams the requested media streams to the network client computer 104. The network client computer 104 renders the data streams to produce a presentation.

Figure 2:
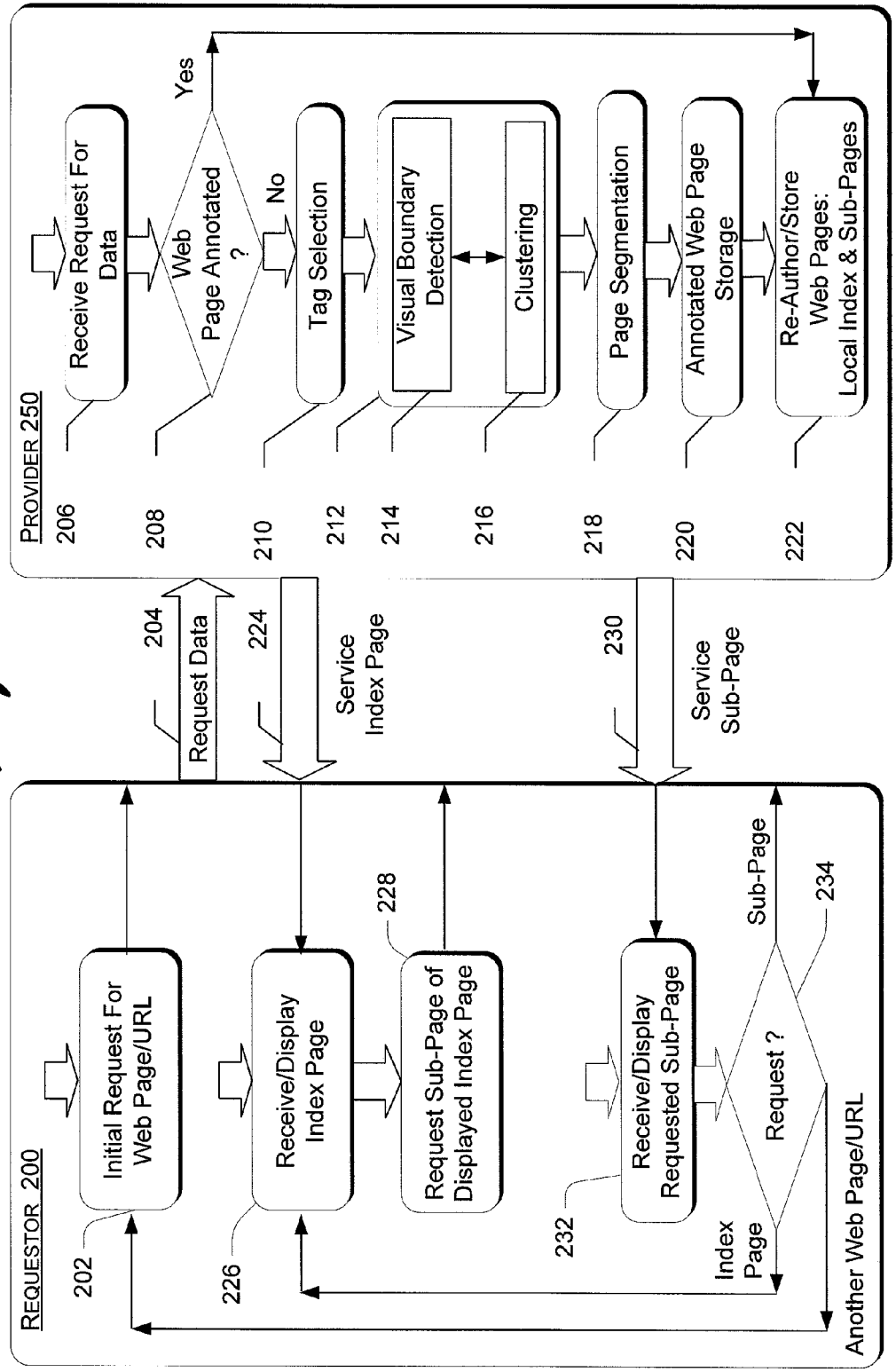
FIG. 2 is a flow diagram of a web page adaptation and presentment process in accordance with one or more implementations, and in which the process has various steps, including a request for a web page from a requester, a provider that performs page analysis on the requested web page including tag structure analysis, visual analysis, and clustering, and service of an index page or an auto-positioned sub-page by the provider to the requestor.

FIG. 2 shows an implementation for a process in which a requestor 200 requests a web page at block 202. At block 204, the request for the web page is relayed to a provider 250. Blocks 204, 224, and 230 in FIG. 2 are representative of transmissions over one of more wired and/or wireless networks. Requestor 200 can be a computing environment similar to network client computer 104 in FIG. 1 and provider 250 can be a computing environment similar to network server computer 102 in FIG. 1. Provider 250 receives the request for the web page at block 206 and queries whether the web page is annotated at block 208. If the web page is annotated, the process moves to a block 222 which is discussed below. Otherwise, the process moved to block 210 where web page analysis begins. A markup language tree tag selection process is performed at block 210 to extract high level structure of the web page using several markup language tag selection rules. Implementations of the markup language tree tag selection process are discussed below in reference to FIGS. 3-4 and 7. After tag selection at block 210, the process moves to block 212 where further web page analysis is conducted. In particular, block 212 extracts low level structure of the web page by visual boundary detection at block 214 in which visual units of the low level structure are provided by clustering at block 216. After blocks 214 and 216 are performed sufficient to extract the low level structure of the web page, the process moves to block 218 where the web page is segmented into sub-pages and then to block 220 where the segmented web page is annotated for an image index page and sub-pages thereof. The annotation, which is a kind of re-authoring of the originally requested web page, is stored for future use at block 222. Provider 250 then serves requester 200 at a transmission at block 224 of the image index page of the requested web page.

Requestor 200 receives the transmission at block 226 at which point a display of the image index page can be made by requestor 200, such as upon a small screen. The image index page can assist the user of requestor 200 in navigating the requested web page. The image index page is a thumbnail view that is marked with one or more sub-pages. At block 232, the user inputs to requester 200. The user's input is examined at block 234.

The user can input one of the sub-pages that the user desires to view in a larger display, such as by tapping upon a touch-sensitive display screen of requestor 200 at the location of the desired sub-page as a means of input. If the user inputs a request for a specific sub-page, block 234 moves control to block 204 where the request for the sub-page is transmitted to provider 250. The user's request for the sub-page is received at block 206. The prior annotation of the requested web page is acknowledged at the query of block 208 such that control moves to block 222 to retrieve the requested sub-page from storage and to transmit the same back to requester 200 at block 230, Requestor 200 receives and displays the requested sub-page at block 232, which display allows the user to input further requests at block 234.

If a sub-page is displayed at block 232 and the user inputs a request to display the thumbnail view of the image index page, control returns to block 226 to display the thumbnail view. In this case, the image index page can be stored locally at requester 200. Alternatively, requester 200 can input a request for the same or a different web page to provider 250, in which case control moves to block 202 for a repetition of the foregoing.

Obtaining the High Level Structure of a Web Page

A web page, especially a large one designed for viewing on a desktop PC, can be logically partitioned into regions, each representing a unit of relatively independent information that can be managed and displayed separately. It is possible that a logical region is complex and contains smaller logical blocks, thus forming a logical region hierarchy. Such a logical region hierarchy represents the semantic structure of a web page. Obtaining the structure requires understanding or analysis of the web page. To assist the computational environment in assessing the semantic of web pages, the structure of the web page can be obtained by leveraging the authors' designing habits.

When designing a web page, especially a large web page, the author usually partitions the web page into several high level regions to set up a scaffold-like structure of the web page. To produce the scaffold, the author usually uses markup language tags for layout purposes at the high level regions of the web page. Therefore, analyzing web page's markup language tag tree can provide enough information to detect the high level structure or regions of the web page. For example, the author would consider whether the page should contain the high level regions of a header, a footer, and side bars. These regions form the periphery of the web page and any body regions, where are also high level regions, are surrounded by the periphery regions. The author may also consider how many topics should appear in the body regions of the web page. For example, the Hyper Text Markup Language (HTML) tag tree of a web page can be used to detect its high level regions.

After setting up the high level regions of the web page, the author fills each region with desired content. Inside the region, if there should be further partitioning, the author usually provides visual separators to tell the reader the boundaries of the content in the web page. Repeating patterns in the region suggest that the objects in the web page that correspond to each pattern probably represent a basic semantic unit.

In this patent, implementations of a web page analysis method focus upon the authoring design habits. The method first analyzes the markup language tag tree structure in order to derive therefrom the high level structures or regions of the web page. These high level regions include a header, a footer, left and right side bars, and one of more body regions. Within each high level structure, a pattern detection algorithm can be used to find one or more basic semantic units. The basic semantic units are then projected to find the visual boundaries of the high level structures. The finding of the visual boundaries produces one or more low level structures for each of the high level structures. The high and low level structure information can then be stored using an annotation mechanism. The stored information can be retrieved and used for displaying the web page on small form factor devices.

From the layout's perspective, each web page can contain one or more of five regions: header, footer, left side bar, right side bar, and one or more body regions. The header and footer regions are typically shorter than the other regions. The header region is located at the top of the web page and the footer region is located at the bottom of the web page. Side bar regions are tall and thin and located at the left or right side of the web page. The body regions are typically neither as short as the header or footer regions nor as thin as the side bar regions. Rather, the body regions are usually located at the center part of the web page so as to attract most of the browsing user's attention.

Based on the layout information in the markup language tree tag structure, the heuristics for the five regions can be found (e.g. header, footer, left side bar, right side bar, and body regions).

Deriving the Header and Footer Regions

Generally speaking, a header region should appear at the top of the page. To do so, the upper N pixels of the web page can be defined as the header region. All of the tree tags falling inside the header region wholly are considered to be header blocks.

The shape of a tag tree region is also taken into account. It is preferable that the shorter tag tree regions have a larger possibility of being placed into the header region. In other words, the shorter the region—the larger the value of N. As illustrated in FIG. 3, a dynamic threshold for the header region can be determined as $N = base\_threshold + F(Height/Width)$, where $F(x) = a/(b*x+c)$, $x = Height/Width$, and $base\_threshold$, $a$, $b$ and $c$ are constants. It is preferred, although optional, that the following value set be used: $base\_threshold = 160$, $a = 40$, $b = 20$, and $c = 1$. The footer region is derived similar to that header region, except that the bottom N pixels of the web page are defined as the footer region.

Deriving the Left and Right Side Bar Regions

A heuristic can be set that any tree tags that fall into the left fourth part of the web page will be considered to be in the left side bar region, where the right fourth corresponds to the right side bar region. Other partitioning besides one third can also be used for the derivation of the opposing side bar regions, which need not be the same size.

The foregoing derivation does not take the shape of the opposing side bar regions into account because they may contains several small regions which are not thin when examining them alone.

Deriving the Body Regions

The regions that do not match the rules for the header, footer and side bar regions are considered to be body regions. The derivation of the body regions, however, can be complex. For example, in a web page, a <BODY> tag can contain a <CENTER> tag as its only child (e.g. the author uses the <CENTER> tag to align the whole page to the middle). When using the rules for the derivation of the header/footer and the side bar regions, it can be concluded that the region of the <CENTER> tag is not header, footer or sidebar. Neither the <BODY> tag nor the <CENTER> tag should be considered to be a body region because a tag that represents a relatively large region will likely contain several high level structure regions. As such, it is desirable to detect each tag that is a relatively large region and then split or divide the tag into smaller blocks.

When tags are associated with relatively large regions, the tag can be split up into smaller blocks, unless the tag matches one or more of the following rules:
  (i) If a tag corresponds to a header or footer region, it does not need to be split;
  (ii) If a tag corresponds to a side bar region, it does not need to be split;
  (iii) If a tag's width or height is smaller than a base line threshold (see FIG. 3, supra), it does not need to be split.

In rule (iii), above, it is preferable to vary the base threshold (e.g. see FIG. 3) for width and height for different kinds of web pages. For example, for the multi-subject web pages typical of a "home page" for a web site used by a large number of users (e.g. msn.com, yahoo.com, aol.com, etc.), it is preferable, although optional, to use 240 pixels for the width and to use 150 pixels for the height.

FIG. 4 shows a web page before and after an implementation of the markup language tree tag selection process that uses formatting information in the markup language (e.g. HTML) of the web page. The result of the tree tag selection process is the detection of several regions as depicted in rectangular blocks, including one header region at the top of the web page, one footer region at the bottom of the web page, one left side bar region, one right side bar region, and four (4) body regions as indicated by reference numerals 1 through 4.

Obtaining the Low Level Structure of a Web Page

In FIG. 4, the second and third body regions have low level structures, but if they are split by their respective tag tree structures, different results are produced. For the second region, splitting it by its tag tree structure will produce a favorable result since its tag tree structure matches its semantic structure. The third region (e.g. the <TABLE> tag) is composed of three columns of content from a semantic point of view. The tag tree structure selection algorithm, however, can partition the region only by the row or by the cell. As such, once the high level structure of the web page has been derived (e.g. the regions), the web page can be farther analyzed to derive there from its low level structure (e.g. one or more blocks within each region).

At the middle level, a web page author usually provides visual boundaries to inform a reader of the structure of the web page. These visual boundaries can be used to detect the low level structures of the web page. There are two kinds of visual boundaries—explicit and implicit. Some markup language tags, such as the HTML tags <HR> and bordered <DIV>, provide explicit indication of boundaries. Sometimes, the author just uses blank areas in the web page to indicate boundary. These boundaries are implicit.

Explicit Boundary Detection

Explicit boundaries can be detected by analyzing the properties of the tag tree structures of a web page. The <HR> tag is a tag tree structure that is a boundary itself. Some tags, such as <TABLE>, <TD> and <DIV>, have border properties. When their border properties are set, there are boundaries at corresponding borders. Besides these two kind of explicit boundaries, there are still boundaries indicated by images. An example of explicit boundaries can be seen in the third body region depicted in FIG. 4, which is also seen at reference numeral 706 in FIG. 7. In these figures, the horizontal line 703a at the top of the image is an <HR> tag. The two vertical lines 703b, 703c at the middle part of the image are <IMG> tags in table cells. Stated otherwise, there are four <TD> tags involved, including two for the content row and two more for the "more xxx . . . " row that is seen in the third body region.

Figure 7:
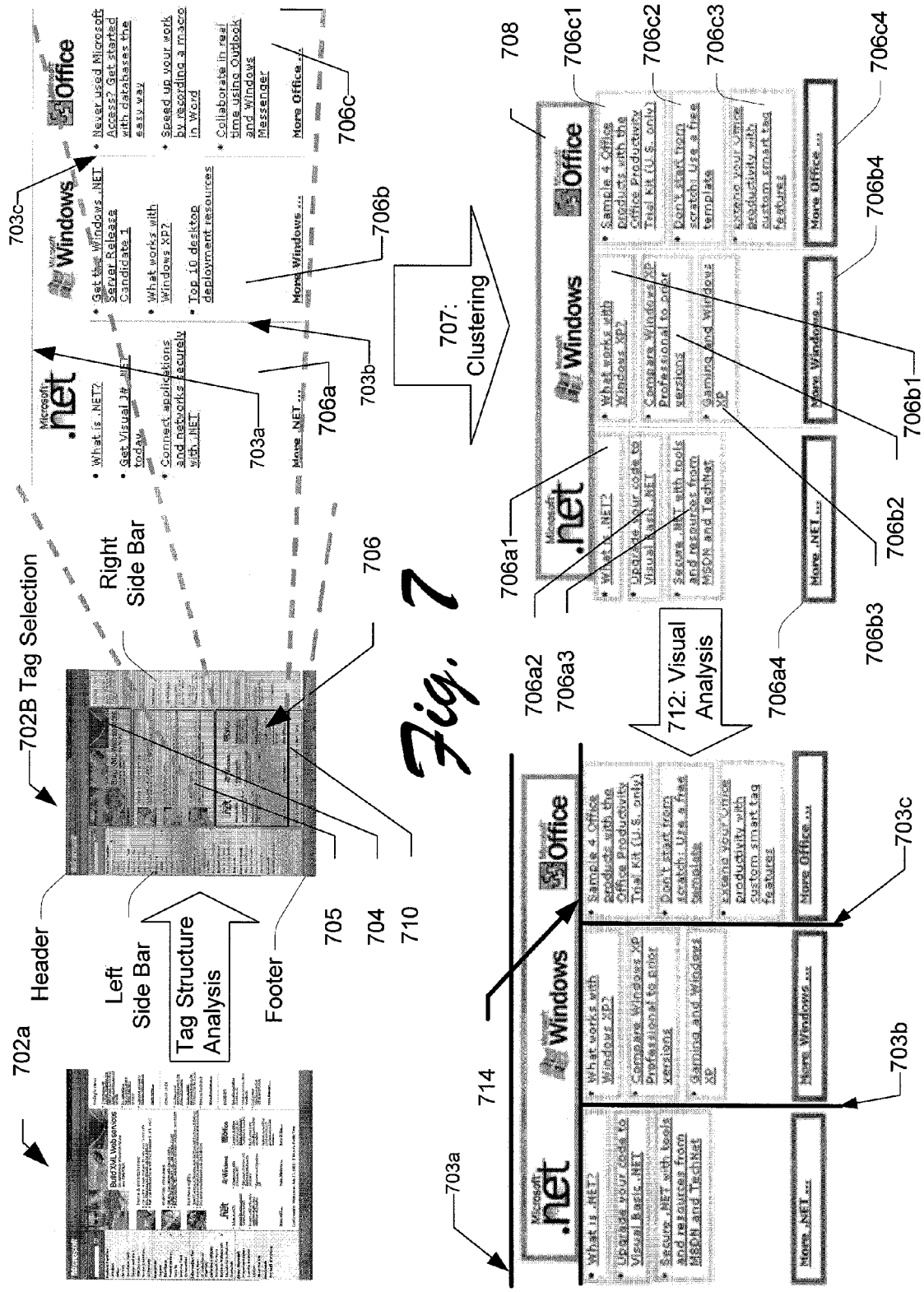
FIG. 7 is a diagram illustrating an overview of an analysis and partitioning of a web page, including processes for markup language tag tree selection, clustering, and visual analysis, where the overview is useful in understanding aspects of one or more described implementations.

From the clues on explicit boundaries, the third body region depicted in FIG. 4 can be further partitioned into four (4) blocks. The partitioning of reference numeral 706 in FIG. 7 into four (4) blocks can be seen with a first block at reference numeral 708 that contains three icons: 'Microsoft NET', 'Microsoft Windows', and 'Microsoft Office'. These three icons are placed in one block because they are actually in a single image. The rest of reference numeral 706 in FIG. 7 is divided into three (3) columns which contain detailed information about Microsoft. NET™, Microsoft Windows®, Microsoft Office®, respectively. FIG. 7 shows reference numeral 703a at the top of the image which is an <HR> tag representing a thin line. FIG. 7 also shows boundary images at reference numerals 703b and 703c which are <TD> tags, each being represented as a thin line. In sub-block 706b, the <HR> tag of reference numeral 703a and the boundary images at reference numerals 703b and 703c are discarded since they are boundaries.

Implicit Boundary Detection

The implicit boundaries are blank areas created intentionally by the authors to indicate content group borders. They cannot be detected directly by analyzing the tag tree structure properties. Since they are blank, a projection based method can be used to detect them.

The whole web page or a part of the web page is composed of a set of content objects, as was disclosed in each of the First, Second, Third, and Fourth Citations. Each content object occupies a rectangular. Projecting these rectangles to one axis that is perpendicular to another axis will generate a chart indicating the number of objects at the direction of each point on the axis (e.g. projecting content object rectangles to the X or Y axis, as was disclosed in the First Citation). A point with a zero projection value indicates a possible implicit boundary which is seen on the web page as being a blank area or a gap.

In one implementation, the projecting of the rectangular shapes serves the goal of identifying blank areas in the high level structure (e.g. the regions) of the web page. To do so, one or more functions of the objects in each region are analyzed on the basis of a layout structure of each function. This analysis is performed by configuring each function into a rectangle. Each rectangle is then projected normally onto each of perpendicular axes (e.g. X and Y axes). One or more separators in each region can then be determined as a function of the sum of the projections on each axis, where each separator projects normal to one of the axes.

In another implementation, the blank areas in each region can be defined by processing the markup language tag tree defining each region to identify therein multiple different objects. Each individual object has one or more properties relating its functions. Functions of the individual objects can then be analyzed. This analysis is conducted by grouping one or more objects associated with the region into a shape that contains at least one function. Each shape is then separated from the other shapes by a separator. Each shape is a rectangle having sides parallel or normal to that of the other rectangles and to the separators. Blanks are then inserted between the shapes. Each shape is then projected normal to two perpendicular axes (e.g. X and Y axes). Each projection along each axis is then quantified. The separators, which represent implicitly determined blank space in the region, can then be identified as being perpendicular to those points along each section of each axis where the quantity of the projections is less than a predetermined threshold.

FIG. 5 shows a fragment 504*a* from a Web page. Fragment 504*a* can be further divided by a transition 506 to a column form 504*b*, which can be better seen by a transition 508 into a sub-block 504*c*. Sub-block 504*c* is a <TD> tag tree structure. The <TD> tag contains four <DIV> tags indicated by the bounding rectangles in sub-block 504*c*. According to the tag tree structure, the <TD> tag can be further partitioned into four parts, each corresponding to one <DIV> tag. From the semantic information, however, it can be seen that the fragment 504*a* should be divided into two blocks each contains two sub-blocks —one of which is 504*c*.

In one implementation, the effective layout information of the four <DIV> tags in the tag tree structure of sub-block 504*b* are collected by a clustering routine that is discussed below with respect to FIG. 6 and transition 707 seen in FIG. 7. The collected information for the four <DIV> tags is represented by four (4) rectangular areas that can then be projected to the Y axis. As seen in FIG. 5 after transition 508, three gaps are seen after projecting the four (4) rectangular areas. It is preferable, although optional, to select the largest gap—which is the middle gap.

Using the explicit and implicit boundary detection processes discussed above, probable visual boundaries can be detected in the web page or fragments thereof. All probable visual boundaries, however, are not proper boundaries. Rather, it is preferable to apply boundary selection rules to select proper boundaries from among the probable visual boundaries that were determined by the explicit and implicit boundary detection processes. These preferred rules are:

a. For the implicit boundaries, the widest gap(s) is/are selected. The widest gap has the longest segment along the Y axis of contiguous points that have a zero projection value;

b. Since a region is to be partitioned into several smaller blocks, only those explicit boundaries that spread from one side of the region to the other side are eligible. For example, the two vertical lines in FIG. 7, indicated by two reference numerals 703*b* and 703*c*, will not be chosen when considering the whole third body region;

c. If implicit boundaries and explicit boundaries are both present, explicit boundaries will be chosen first.

Clustering

Because the implicit boundary detection process discussed above is based on projecting the detected visual units to the X or Y axis to find the gaps, it can be sensitive with the input visual units. If the visual units are too big, it will probably lose some useful gaps. If the visual units are too small, there will be too many small gaps. In order to maximize the useful gaps while minimizing the gaps that are noise (e.g. too small to be easily discerned), a pattern recognition process can be used to cluster the leaf markup language tags (e.g. leaf HTML tags) into small groups and produce the visual units. In illustration of the pattern recognition process, FIG. 6 shows a sub-block 504*c* that was determined from the visual boundary detection processes discussed above. Sub-block 504*c* corresponds to the fourth ($4^{th}$) DIV tag in block 505*b*. A transition 602 seen in FIG. 6 illustrates the identification of the tag tree structure of sub-block 504*c*.

Sub-block 504*c* in FIG. 6 contains a tag sequence 604 which is "<A><BR><A><BR><A><BR><BR>". It can be determined that the "<A><BR>" is the most frequent pattern in the tag sequence 604. According to it, each "<A><BR>" can be formed into three small groups of tag sequences seen at reference numeral 612. Then, the three small groups 612 can be grouped into a virtual node VN 608 since it is a list. Now the detail structure inside a DIV 606 changes into the tree structure form shown in the mid-section of FIG. 6. The virtual node VN 608 is preferred to become a visual unit for implicit boundary detection (e.g. by projecting the corresponding rectangular area) since a last BR 610 represents an empty line. For the four blocks depicted after transition 508 in FIG. 5, if the second block corresponding to the second DIV tag was selected as the visual unit, the gap under it would not be wide enough to be preferred because the DIV tag contains an extra BR which will extend the height of the second block, similar to that seen in the tag tree structure depicted in FIG. 6.

An implementation of a clustering process 616 is depicted in the latter portion of FIG. 6 after transition 614. At block 620 of clustering process 616, a collection is made of the basic nodes (e.g. a collection of all of the atomic nodes in the HTML Document Object Model (DOM) tree, as was disclosed in the Second Citation.). The collected basic nodes are then arranged in the order of the markup language document sequence (e.g. the HTML document sequence). The basic nodes include all the leaf tags. Some special tags are also basic nodes regardless of whether they are a leaf node or not. For example in the HTML markup language, the tag <A> should always be a basic node since it denotes a hyperlink. Other special tags include <MARQUEE>, <SELECT>, <MAP>, etc. Because tag and text can become a tag's child at the same time in HTML, collecting leaf tags only will probably leave the text nodes out. So the text nodes are also basic nodes. If a text node is the only child of a tag, the tag will be selected as the atomic node.

After the basic nodes have been collected and ordered at block 620, clustering process 616 moves to block 622 where the basic nodes are classified into categories based upon text font, size, color, and tag properties. The basic nodes in the same category will be represented by a symbol thus changing the node sequence into a symbol string.

After block 622 has transformed the collection of basic nodes into a symbol string, clustering process 616 moves to block 624 where all the possible patterns are detected (e.g. sub-strings of the symbol string). The detected patterns are counted as to their frequency in the symbol string (e.g. the number of times that the sub-string appears in the symbol string). Among the patterns with highest frequency, the longest pattern is selected. The longest pattern is then grouped into a new symbol if its length is bigger than 1. If the length is equal to 1, clustering process 616 moves to block 626 where an attempt will be made to merge adjacent symbols. If no merge can occurs, clustering process 616 return to block 624 where the pattern with next highest frequency will be selected. Clustering process 616 can be applied on the newly created string until the highest frequency is below a predetermined threshold. Each non-blank symbol in the last string represents a visual unit for boundary detection. The blank symbol includes the <BR> tag, space characters, a blank <TD> tag (e.g. a <TD> tag that contains space characters only), a blank <MAP> tag, a blank <SCRIPT> tag, etc.

An exemplary overview of the foregoing tag structure analysis, clustering, and visual analysis for a fragment 706 of a web page 702*a* is seen by a transition sequence depicted in FIG. 7. Following a markup language tag tree structure analysis, web page 702*a* can be represented as a web page 702*b* that is divided into regions that include a header, a footer, left and right side bars, and four body regions 704, 705, 706, and 710. Body region 706 can be divided into the three (3) columns 706*a*, 706*b*, and 706*c*. Each column contains low level structure information respectively corresponding to the icon in a block 708 (e.g. Microsoft .NET™, Microsoft Windows®, Microsoft Office®). As discussed above, three lines divide the three columns, including one line for the reference numeral 703*a* at the top of the image, and two lines for the two reference numerals 703*b* and 703*c*.

A clustering process 707 (e.g. an example of which is also seen as process 616 in FIG. 6) is performed to derive sub-blocks from web page fragment 706. To do so, basic nodes are collected, organized, and classified. Markup language tag patterns are detected and the detected patterns are merged where desirable and/or in accordance with predetermined rules. The result of the clustering process 707 is four sub-blocks in each of the three columns 706*a*, 706*b*, and 706*c*. Clustering process 707 derives from column 706*a* the sub-blocks 706*a*1, 706*a*2, 706*a*3, and 706*a*4. Sub-blocks 706*b*1, 706*b*2, 706*b*3, and 706*b*4 are derived from columns 706*b* by clustering process 707. Clustering process 707 also derives from column 706*c* the sub-blocks 706*c*1, 706*c*2, 706*c*3, and 706*c*4. Each sub-block is a rectangular area that can be projected to perpendicular X and Y axes. Segments along these axes that are composed of points having a zero projection value represent blank areas of the web page that are eligible to be implied visual boundaries. The longest segments, as was discussed above with respect to FIGS. 5-6, are preferred as the implicitly determined boundaries in the web page.

A visual analysis process 712, which can be performed after clustering process 707, uses explicit and implicit boundary detection rules to locate boundaries for the blocks seen at reference numerals 703*a*, 703*b*, and 703*c* for fragment 706 of web page 702*a*. The boundary indicated by reference numeral 714 can also be derived by explicit and implicit boundary detection rules.

Storage of Web Page Analysis Results

The processes indicated in FIG. 7 are repeated for all of web page 702*a* until a complete analysis thereof has been made. After the analysis, a result can be stored for future use. If each logical block corresponds to one tag, which is the case for the output of the tag selection process set forth above, a special attribute can be added to each tag to indicate whether it is a logical block. For example, "<P block="true"> . . . </P>" means that all the content inside this tag (including P itself) constitutes a logical block. However, as indicated in the above discussion of visual boundary detection (explicit and implicit) and clustering processes, there are multi-level logical blocks and each logical block does not correspond to one tag. In this case, a logical block hierarchy structure is desirable to store the analysis result. An annotation mechanism can be used to store the logical block hierarchy structure of a web page into an external markup language file, such as an XML file where the corresponding place of a block in the original HTML document is indicated by XPath and XPointer. Such an annotation mechanism can be used to store the analysis result into a separate file.

By storing the structure information of a web page in a separate external markup language file, two advantages are gained. First, the separate file represents the logical block hierarchy structure without modifying the original markup language document. Second, for a set of web pages with the same structure template, a single structure file can be used for each page in the set of web pages.

Summary of Tag Selection, Clustering and Visual Boundary Detection Processes

The structure of a web page can be obtained by the above described tag tree selection, clustering, and visual boundary detection processes. In that the semantic structure of a web page is difficult to derive, typical design habits of authors can be used to extract the representation structure of a web page in an analysis process that includes two steps. The first step extracts high level structure information about the web page using several markup language tag tree selection rules. The second step extracts low level structure information about the web page by visual boundary detection, in which the visual units are provided by the clustering process.

Re-Authoring Web Pages

After obtaining and storing the web page structure, adaptation can be conducted according to the clues provided by structure. For a large web page in terms of layout, viewing it on small form factor devices requires extensive scrolling, which makes the browsing experience more difficult. One implementation involves adapting a large web page to shrink it so that it will fit in the small screen of a small form factor device (e.g. a mobile handheld device) by splitting it into smaller sub-pages. This implementation is discussed below.

Web Page Splitting Schemes

There are various ways of splitting a web page, which can be characterized into two basic actions: single-subject splitting and multi-subject splitting. Single-subject splitting splits the whole web page into several sub-pages and connects the sub-pages with next/back hyperlinks. The result of single-subject splitting is a double link list. While browsing, the user has to access sub-pages one by one in the sequence of the link list. Multi-subject splitting generates a local index page in addition to the sub-pages. The local index page contains hyperlinks pointing to each sub-page. So the result of multi-subject splitting is a star-like structure. While browsing, the user will receive the local index page first. Then the user can access each sub-page through the hyperlinks in the index page. Thus, the multi-subject splitting introduces a bi-level browsing experience. The multi-subject spitting technique is preferred, although optional, in that it cannot be readily determined whether a web page is single-subject or multi-subject.

Figure 8:
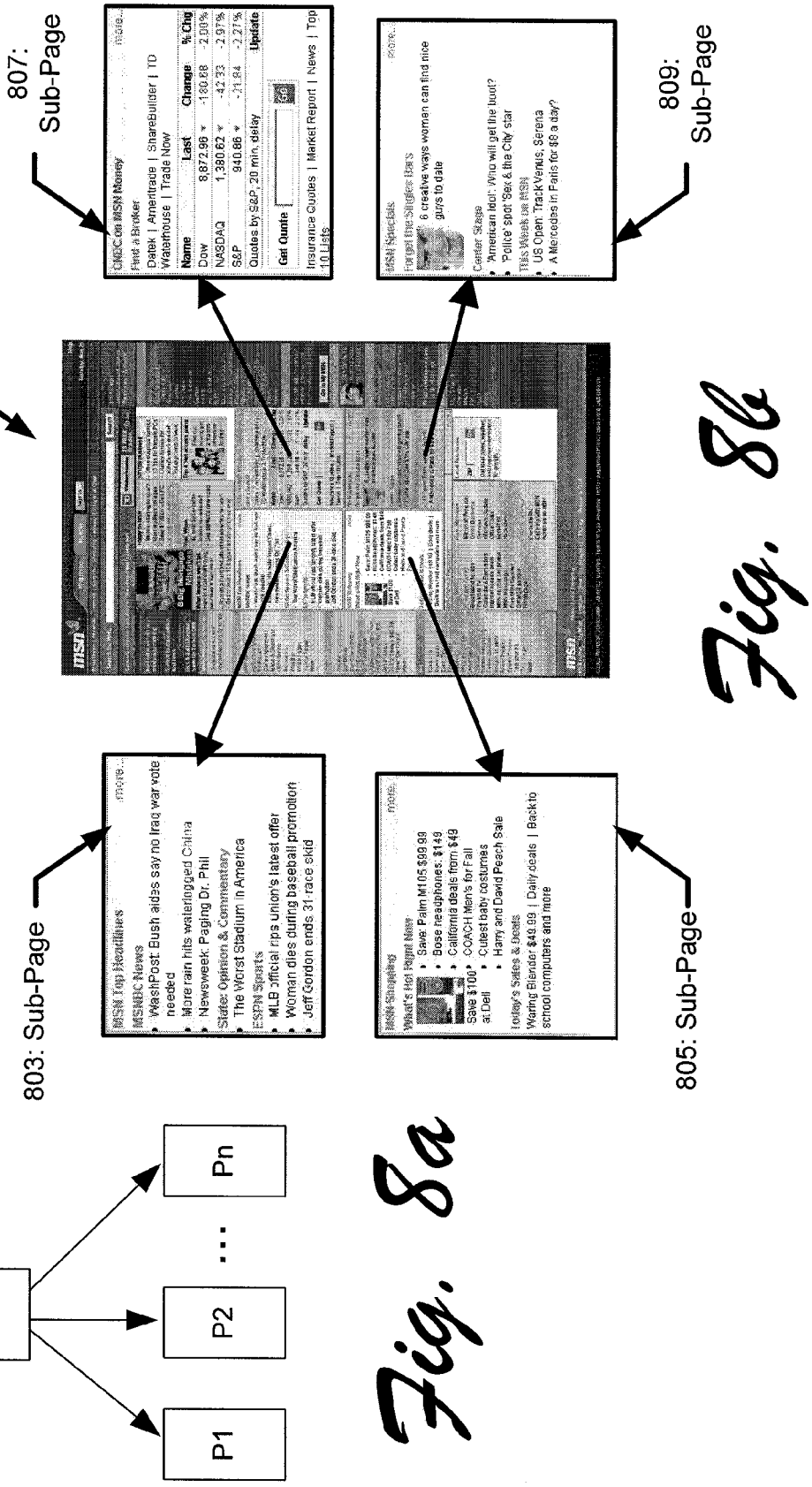
FIGS. 8a and 8b are, respectively, a block diagram of an index page with corresponding sub-pages and an example of a web page expressed as an index page that is split into smaller sub-pages for separate viewing.

An example illustrating multi-subject splitting is seen in FIG. 8*a* where a thumbnail image of a local index page has been generated from a multi-subject web page that has been split into sub-pages, where the sub-pages are generated as the images seen in P1 through Pn. Multi-subject splitting includes sub-page generation and local index page generation which are discussed below.

Sub-Page Generation

A prerequisite of sub-page generation is selecting appropriate logical blocks (e.g. regions) from the web page structure. For small form factor devices, the appropriate logical block should be small enough to fit into the small screen of the device. Since web browsing typically involves vertical scrolling, in that horizontal scrolling is disfavored, the width of a selected logical block should be smaller than or equal to the small screen of the device while its height can be larger. However, there are some logical blocks that have a small height hut also have a large width. Splitting these logical blocks can produce too many sub-blocks. Alternatively, the logical block can be a header or footer region which cannot be made smaller as to its width dimension. So, the short blocks should be selected if their heights are smaller than the screen height. Thus the criterion becomes that the block height should be less than or equal to the screen height or block width should be less than or equal to the screen width.

After selecting the appropriate logical blocks, their corresponding markup language contents should be extracted from the original web page and put in the newly created sub-pages. The XPath and XPointer tags can be used to store the correspondence between the logical block and the corresponding markup language content. According to these clues, the content of the logical block can be extracted.

The extracted content cannot be put into a sub-page directly because of two problems: the style information and the hyperlinks.

Style Extraction

A markup language standard can permit a web page author to specify the content style. For example, the HTML standard can permit a web page author to use a Cascading Style Sheet (CSS) and style inheritance to specify the content style. The CSS allows authors to define the styles of tag, tag class or tag instance. Style inheritance allows author to specify a node's style at one of its ancestor nodes. Extracting the block content may probably lose some style information because the style information from the CSS and the style inheritance is not located with the content.

In order to keep the block similar with the original web page, the style information can be collected. For the CSS case, since the CSS is usually specified in the <HEADER> tag using <STYLE> or <LINK>, the <HEADER> section of the original web page can be simply copied to each sub-page.

For the style inheritance case, a trace can be made along the parent link of the target node and a collection can then be made of all of the style information of each parent tag. The style information from ancestor nodes and the node itself are merged as child nodes, with higher priority over ancestor nodes.

Hyperlinks

Web page use internal hyperlinks to assist the user in locating content inside the web page. In these web pages, authors use <A id="id1"> ... </A> to specify a place in the web page. Then <A href="#id1"> ... </A> can be used as the pointer to the specified place. When clicking on the internal hyperlinks, the browser will scroll to the specified place.

If the web page is split into several sub-pages, the place specifier and the pointer may appear in different sub-pages. For example, <A id="id1"> ... </A> may appear in t1.htm while <A href="#id1"> ... </A> appears in t2.htm. In this case, the browser will fail to bring the user to t1.htm on clicking the pointer in t2.htm if the pointer <A> is kept unchanged. The solution is to change the pointer in t2.htm to <A href=" ... t1.htm#id1">. </A>. A module, routine, or process that splits the web page can be made to search the internal hyperlinks and change the pointer to an appropriate form.

The sub-page can include both 'inter' and 'intra' hyperlinks. Each sub-page can include one or more hyperlinks that link to another location within the sub-page (e.g. an 'intra-sub-page' hyperlink). Each sub-page can also include one or more hyperlinks that link to another sub-page (e.g. an 'inter-sub-page' hyperlink).

Another problem concerns the resolution of relative hyperlinks. A web page author can specify absolute hyperlinks or relative hyperlinks in <A> and <AREA>. The browser resolves the relative hyperlinks to absolute ones according to a base URL of the web page. The default base URL is the URL of the web page. An author, however, can override the base URL using a <BASE> tag. The <BASE> tag resides in the <HEADER> section, which becomes another reason for copying the <HEADER> section to each sub-page.

The image maps (e.g. the <MAP> tag) also imposes some difficulties on sub-page generation, since an <IMG> tag can reference a <MAP> defined at any place in the original web page. Preserving the image map can be done by searching the referenced <MAP> across the original page and adding its content to the sub-page where the <IMG> resides.

Local Index Page Generation

Because the multi-subject splitting scheme is preferred, the local index page should be generated after all the sub-pages have been generated. In the local index page, the central problem is to generate proper hyperlinks to the sub-pages.

Generating the 'href' values can be based on a sub-page naming strategy. Each sub-page can be named in the form of origin_xxx.htm, where the 'origin' denotes the name of the original web page and 'xxx' denotes a number. For example, the first sub-page of default.htm is default_1htm, the second one is default_2.htm, and so on.

Besides the 'href' values, content is needed to represent the hyperlinks (e.g. the content between <A> and </A>). If the content is in text, a summarization utility can be run against each sub-page to produce the content text. Image content hyperlinks are preferred for sub-pages that mainly contain images.

As seen in FIG. 8b, a thumbnail image 800 is generated for an original web page. To assist the user of a small form factor device having color display capabilities, it is preferable to mark the sub-pages with different colors. An <IMAGE> tag can be used to reference the thumbnail image and a corresponding <MAP> tag can be placed in the local index page. While browsing the local index page, the user can select or 'click' on a specific colored sub-page of the thumbnail image to go to the selected corresponding sub-page. As seen in FIG. 8b, sub-pages 803, 805, 807, and 809 have been generated from the original web page and are delineated on the thumbnail image 800 of the local index page to be readily selected for bi-level browsing by a user. For example, the user can use the up/down/left/right button on a user interface (UI) of a small form factor device to move the window display thereof between the sub-pages depicted on the thumbnail image 800 of the local index page. Once selected from the small icon of the entire web page, the selected display will zoom to a larger display of the selected sub-page.

A certain amount of processing is required in order to accomplish the analysis and partitioning of each web page requested by a small form factor device. If the latter is not powerful enough, the analysis and partitioning can be performed at the corresponding proxy server or another web server or an edge server. Alternatively, the analysis and partitioning can be distributed across one or more such devices. For example, the analysis and partitioning of each web page can be performed by an editor, by the client device or by a third party service provider:

(i) A web page editor (e.g. FRONTPAGE® software from the Microsoft Corporation of Redmond, Wash., USA) can add special attributes to mark up language tags to indicate sub-pages. A browser (INTERNET EXPLORER® software from the Microsoft Corporation of Redmond, Wash., USA) on a small form factor device can recognize these attributes and provide intelligent positioning.

(ii) If the web page editor does not provide the special attributes, a third party web service can perform page layout analysis on the fly and add the layout information as a service.

(iii) If the client device is powerful enough, it can perform page layout analysis by itself and provide this capability.

Prioritization Of The Regions

Figure 9:
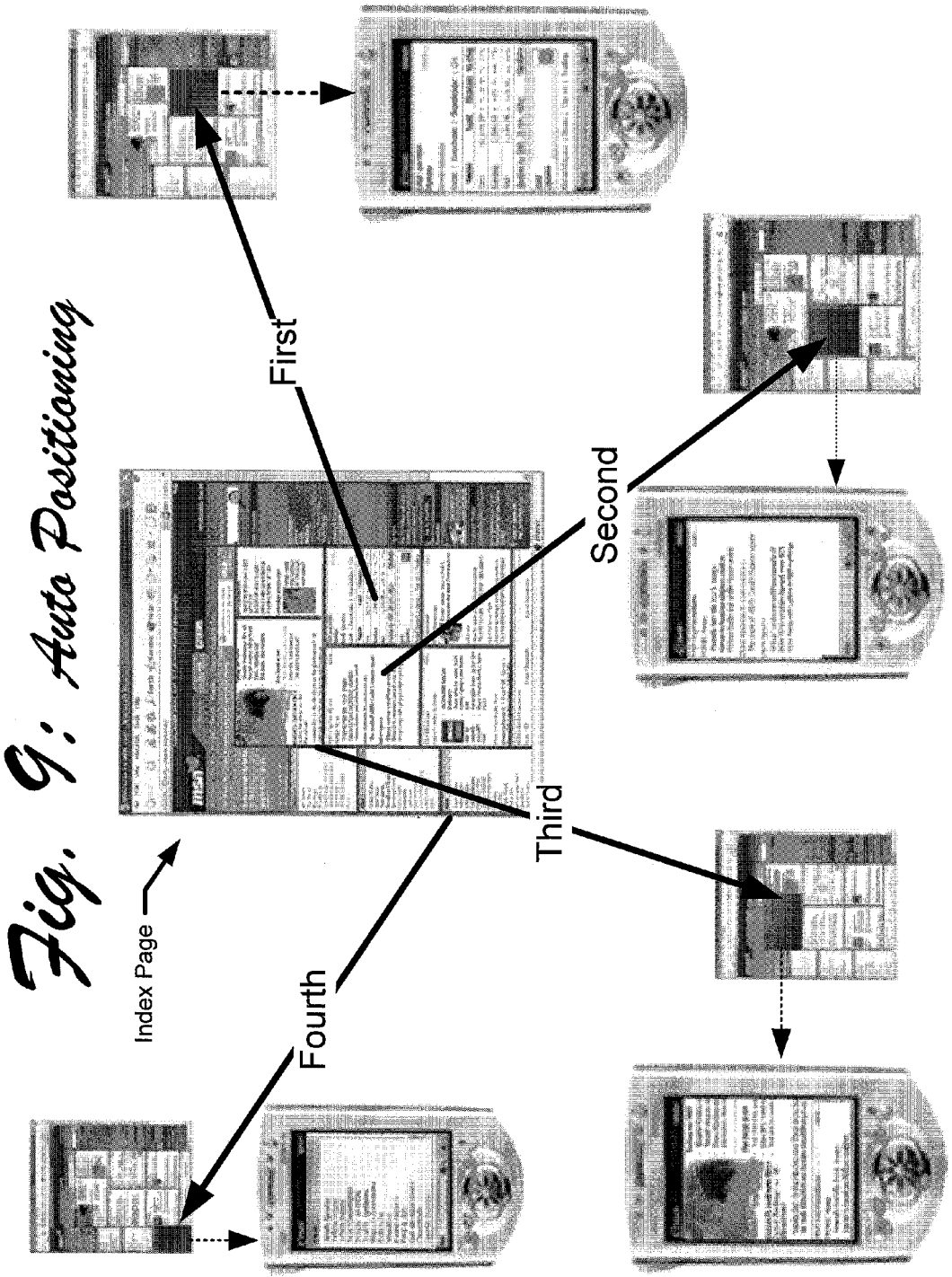
FIG. 9 is a diagram of an exemplary web page to which an auto-positioning process has been applied for prioritized viewing of sub-pages thereof on a small form factor device in accordance with various implementations.

Some simple text analysis and heuristic rules can be used to identify which region contains more important information to a browsing user. The browser may start by displaying a sub-page of an index page that has been determined to have the most importance. The sub-pages can be prioritized according to their importance when assisting the user to navigate them. To illustrate this, FIG. 9 shows an example of content adaptation from a desktop display to a display that can be rendered by browsing software for a small form factor device (e.g. Microsoft® Pocket PC software provided by the Microsoft Corporation of Redmond, Wash., USA). In the adaptation depicted in FIG. 9, a thumbnail image 800 of an index page contains a plurality of icons. Each icon represents a sub-page of the original web page, including four (4) sub-pages that have been determined to be of interest, in the particular order indicated, to a user.

Learning a User's Browsing Pattern to Enhance Device Performance

A. If the user often follows a particular path or always wants to see a particular sub-page of a web page (e.g. a stock quote in the www.MSN.com home page), such knowledge can be acquired by a passive learning algorithm. Then, the next time when the user browses to visit the same home page again, the browser will have been trained to immediate start with that sub-page.

B. Keywords from each sub-page can be extracted and matched with user's previously specified interests. When the user browses a web page, the browser can position directly to the sub-page which the user is most interested in.

On a small form factor device, the browser software can passively track a user's browsing behaviour to learn the user's interests. When browsing, the browser software will prioritize one or more sub-pages of a web page using the methods described above. Then, the browser software will direct a display of the derived most important sub-page of the web page. An example of the result of active and passive learned browsing behaviour is seen in FIG. 9. In FIG. 9, the browser software learns that the user is most interested in the mid-right side of the index page. So when the user browses the web page, the browser software goes to that sub-page first and positions the sub-page properly inside the screen. The browser software can also learn secondary interests of the user. When so learned, the browser can, with a push of a button on the UI, take the user in a sequence of the most to least favorite sub-pages of the index page. As seen in FIG. 9, first through fourth sub-pages are displayed upon demand in a sequence derived by the browsing software from active and/or passive learning procedures.

For the web pages that use scripts extensively, a multi-subject splitting technique can be avoided in favor of providing scrolling assistance through an auto-positioning solution. In the auto-positioning solution, a plug-in for the browser software can be provided. When the plug-in is invoked, it will analyze the web page currently be browsed and produce proper sub-pages according to the target size of the display on the small form factor device. Then the browsing view will be switched to a thumbnail view which is similar with the local index page in the multi-subject splitting solution. Clicking on the thumbnail will switch back to the browsing view and the focus will be on the corresponding sub-page that was selected by the user's input 'click' function.

Exemplary Computer Environment

The embodiments described above can be implemented in connection with any suitable computer environment. Aspects of the various embodiments can, for example, be implemented, in connection with server computers, client computers/devices including small form factor devices, or both server computers and client computers/devices. As but one example describing certain components of an exemplary computing system, consider FIG. 10.

Figure 10:
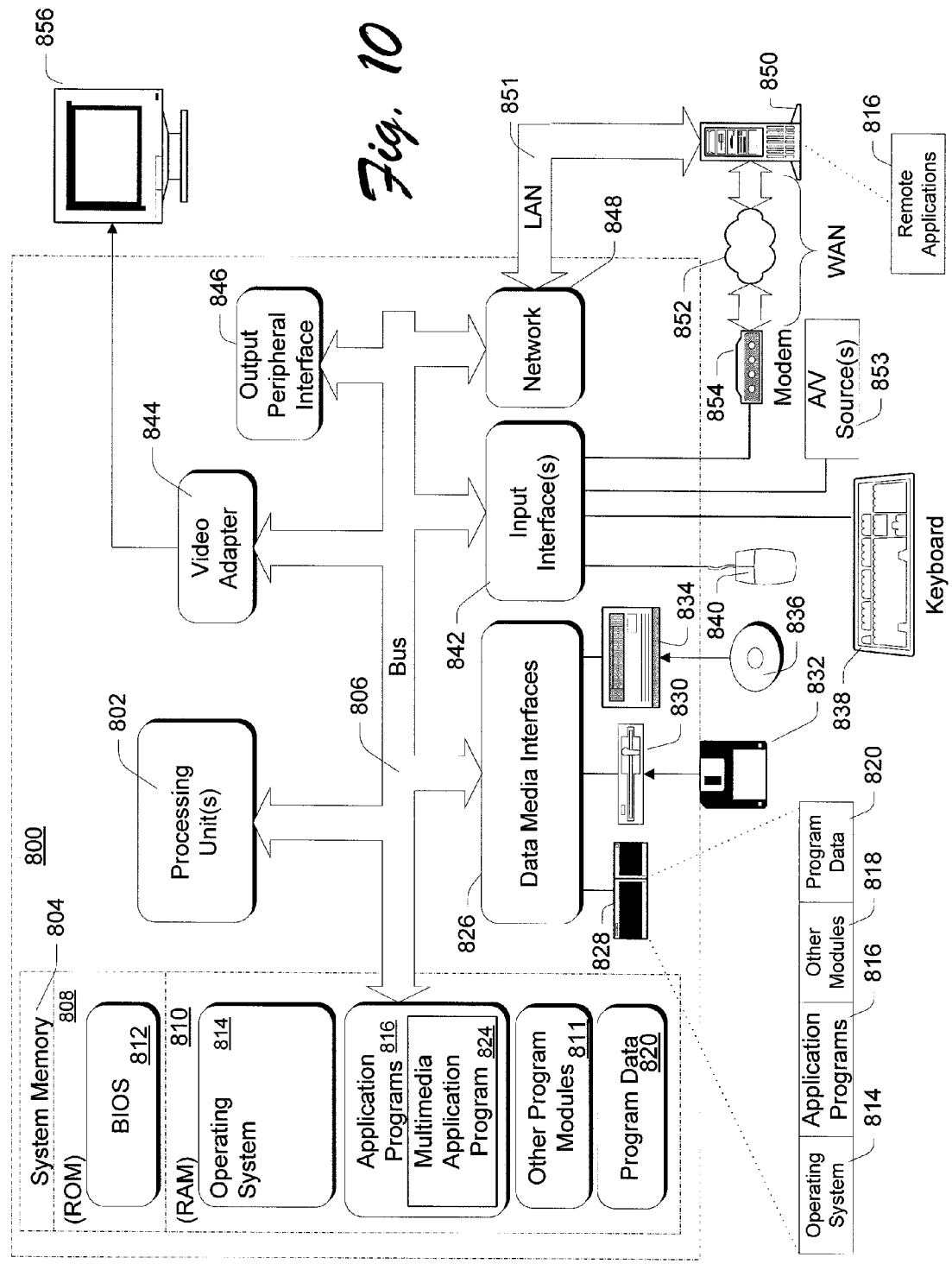
FIG. 10 is a block diagram of an exemplary computer environment in which various implementations can be practiced.

FIG. 10 illustrates an example of a suitable computing environment 800. It is to be appreciated that computing environment 800 is only one example of a suitable computing environment and is not intended to suggest any limitation as to the scope of use or functionality of the inventive embodiments. Neither should the computing environment 800 be interpreted as having any dependency or requirement relating to any one or combination of components illustrated in the exemplary computing environment 800.

The inventive techniques can be operational with numerous other general purpose or special purpose computing system environments or configurations. Examples of well known computing systems, environments, and/or configurations that may be suitable for use with the inventive techniques include, but are not limited to, personal computers, server computers, thin clients, thick clients, hand-held or laptop devices, multi-processor systems, microprocessor-based systems, set top boxes, programmable consumer electronics, network PCs, minicomputers, mainframe computers, distributed computing environments that include any of the above systems or devices, and the like.

In certain implementations, the inventive techniques can be described in the general context of computer-executable instructions, such as program modules, being executed by a computer. Generally, program modules include routines, programs, objects, components, data structures, etc. that perform particular tasks or implement particular abstract data types. Implementations may also be practiced in distributed computing environments where tasks are performed by remote processing devices that are linked through a communications network. In a distributed computing environment, program modules may be located in both local and remote computer storage media including memory storage devices.

In accordance with the illustrated example embodiment of FIG. 10 computing system 800 is shown comprising one or more processors or processing units 802, a system memory 804, and a bus 806 that couples various system components including the system memory 804 to the processor 802.

Bus 806 is intended to represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) buss also known as Mezzanine bus.

Computer 800 typically includes a variety of computer readable media. Such media may be any available media that is locally and/or remotely accessible by computer 800, and it includes both volatile and non-volatile media, removable and non-removable media.

In FIG. 10, the system memory 804 includes computer readable media in the form of volatile, such as random access memory (RAM) 810, and/or non-volatile memory, such as read only memory (ROM) 808. A basic input/output system (BIOS) 812, containing the basic routines that help to transfer information between elements within computer 800, such as during start-up, is stored in ROM 808. RAM 810 typically contains data and/or program modules that are immediately accessible to and/or presently be operated on by processing unit(s) 802.

Computer 800 may further include other removable/non-removable, volatile/non-volatile computer storage media. By way of example only, FIG. 10 illustrates a hard disk drive 828 for reading from and writing to a non-removable, non-volatile magnetic media (not shown and typically called a "hard drive"), a magnetic disk drive 830 for reading from and writing to a removable non-volatile magnetic disk 832 (e.g., a "floppy disk"), and an optical disk drive 834 for reading from or writing to a removable, non-volatile optical disk 836 such as a CD-ROM, DVD-ROM or other optical media. The hard disk drive 828, magnetic disk drive 830, and optical disk drive 834 are each connected to bus 806 by one or more interfaces 826.

The drives and their associated computer-readable media provide nonvolatile storage of computer readable instructions, data structures, program modules, and other data for computer 800. Although the exemplary environment described herein employs a hard disk 828, a removable magnetic disk 832 and a removable optical disk 836, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk 828, magnetic disk 832, optical disk 836, ROM 808, or RAM 810, including, by way of example, and not limitation, an operating system 814, one or more application programs 816 (e.g., multimedia application program 824), other program modules 818, and program data 820. Some of the application programs can be configured to present a user interface (UI) that is configured to allow a user to interact with the application program in some manner using some type of input device. This UI is typically a visual display that is capable of receiving user input and processing that user input in some way. Such a UT may, for example, comprise one or more buttons or controls that can be clicked on by a user.

Continuing with FIG. 10, a user may enter commands and information into computer 800 through input devices such as keyboard 838 and pointing device 840 (such as a "mouse"). Other input devices may include a audio/video input device(s) 853, a microphone, joystick, game pad, satellite dish, serial port, scanner, or the like (not shown). These and other input devices are connected to the processing unit(s) 802 through input interface(s) 842 that is coupled to bus 806, but may be connected by other interface and bus structures, such as a parallel port, game port, or a universal serial bus (USB).

A monitor 856 or other type of display device is also connected to bus 806 via an interface, such as a video adapter 844. In addition to the monitor, personal computers typically include other peripheral output devices (not shown), such as speakers and printers, which may be connected through output peripheral interface 846.

Computer 800 may operate in a networked environment using logical connections to one or more remote computers, such as a remote computer 850. Remote computer 850 may include many or all of the elements and features described herein relative to computer 800.

As shown in FIG. 10, computing system 800 can be communicatively coupled to remote devices (e.g., remote computer 850) through a local area network (LAN) 851 and a general wide area network (WAN) 852. Such networking environments are commonplace in offices, enterprise-wide computer networks, intranets, and the Internet.

When used in a LAN networking environment, the computer 800 is connected to LAN 851 through a suitable network interface or adapter 848. When used in a WAN networking environment, the computer 800 typically includes a modem 854 or other means for establishing communications over the WAN 852. The modem 854, which may be internal or external, may be connected to the system bus 806 via the user input interface 842, or other appropriate mechanism.

In a networked environment, program modules depicted relative to the personal computer 800, or portions thereof, may be stored in a remote memory storage device. By way of example, and not limitation, FIG. 10 illustrates remote application programs 816 as residing on a memory device of remote computer 850. It will be appreciated that the network connections shown and described are exemplary and other means of establishing a communications link between the computers may be used.

Conclusions

Implementations include a web page adaptation method of page partitioning and bi-level browsing convention to improve the browsing experiences on small form factor devices. The web page adaptation method includes the two stages of analysis of the web page to obtain its structure and page splitting. In the analysis stage, a hierarchy is created to represent the web page's semantic and visual structure. According to this hierarchy and the screen size of the small form factor device browsing the web page, appropriate blocks are selected as sub-pages. After sub-page generation, an image index page with block marking is created to assist navigation. A bi-level browsing convention first displays to a user a thumbnail image of the index page having thereon a plurality of icons representing sub-pages. Then user can click on one of the sub-page icons to browse an enlarged image of the corresponding sub-page.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. One or more computer-readable storage media having computer-readable instructions thereon which, when executed by one or more processors, cause the one or more processors to perform a method comprising:
  extracting high level structure information about a web page using markup language tag tree selection rules to define high level boundaries;
  extracting low level structure information within each high level structure information by:
    identifying explicit visual boundaries from the properties of one or more tags of the markup language tag tree by clustering the one or more tags in a pattern detection algorithm enabling the detection of one or more regions within the high level structure information;
    identifying visual units by boundary detection from the markup language tag tree corresponding to each high level structure information; and
    projecting each visual unit perpendicularly to an axis to identify implicit boundaries between the visual units;

storing the high level boundaries, the implicit boundaries, and the extracted high and low level structure information of the web page using an annotation mechanism, and for a predetermined display screen having a width, identifying a plurality of sub-pages of the web page using the high level boundaries, the implicit boundaries, and the extracted high and low level structure information of the web page, wherein each sub-page has a width not greater than the width of the predetermined display screen;

forming a thumbnail image of the web page having partitions corresponding to the one or more sub-pages;

forming a hyperlink to each sub-page from a corresponding partition of the thumbnail image of the web page; and storing the sub-pages, the thumbnail image, and the hyperlinks using the annotation mechanism.

2. The one or more computer-readable storage media as defined in claim 1, wherein the identifying visual units further comprises:

collecting basic nodes from the markup language tag tree corresponding to each said high level structure information;

classifying the collected basic nodes;

grouping similar classifications of the collected basic nodes into symbol strings;

detecting and merging adjacent similar patterns in the symbol strings of the classified collected basic nodes to form new symbol strings; and determining each non-blank symbol in each remaining symbol string to be one identified visual unit for implicit boundary detection.

3. The one or more computer-readable storage media as defined in claim 1, wherein the method further comprises, for contents of each said sub-page, extracting any style information from the markup language tag tree of the web page for inclusion in the sub-page.

4. A method comprising:

using a markup language tag tree of the web page to extract regions of the web page including a header, a footer, left and right side bar regions, and one or more body regions encompassed by the header region, the footer region, the left side bar region, and the right side bar region;

identifying visual boundaries within each region by:
arranging the properties of the tags of the markup language tag tree by clustering the tags in a pattern detection algorithm enabling the detection of the regions of the web page;

projecting, normal to an axis, each shape represented by one or more semantic units of the tags of the markup language tag tree in each region;

determining the additional visual boundaries from projection values on the axis; and for a predetermined display screen, identifying a plurality of sub-pages of the web page using the identified visual boundaries and the regions, where each sub-page has a width not greater than the width of the predetermined display screen;

forming a thumbnail image of the web page having partitions corresponding to the one or more sub-pages;

forming a hyperlink to each sub-page from a corresponding partition of the thumbnail image of the web page; and storing the sub-pages, the thumbnail image, and the hyperlinks using an annotation mechanism.

5. The method as defined in claim 4, further comprising, for the contents each sub-page, extracting any style information from the markup language tag tree of the web page for inclusion in the sub-page.

6. One or more computer-readable storage media having computer-readable instructions thereon which, when executed by one or more processors, cause the one or more processors to implement the method of claim 4.

7. A method comprising:

analyzing a markup language tag tree of a web page to identify:

peripheral regions of the web page including header, footer, left, and right regions; and one or more body regions adjacent to at least one peripheral region;

within the markup language tag tree that defines each peripheral and body region:

identifying visual boundaries given in the properties of the tags of the markup language tag tree by clustering the tags of the markup tag tree in a pattern detection algorithm enabling the detection of the peripheral regions of the web page and the one or more body regions of the web page; and identifying blank areas by:
analyzing one or more functions on the basis of a layout structure of each function by:
configuring each function into a rectangle;
projecting each rectangle normally onto each of perpendicular axes;
determining one or more separators that are each normal to the axes as a function of a sum of projections on each axis where the quantity of the projections is less than a predetermined threshold; and for a predetermined width of a display screen, identifying a plurality of sub-pages of the web page each having a width not greater than the predetermined width of the display screen and using:

the peripheral regions of the web page including header, footer, left, and right regions;

the one or more body regions adjacent to at least one peripheral region;

the visual boundaries identified in the properties of the tags of the markup language tag tree;

the one more separators; and forming a thumbnail image of the web page having partitions corresponding to the one or more sub-pages;

forming a hyperlink to each sub-page from a corresponding partition of the thumbnail image of the web page; and storing the sub-pages, the thumbnail image, and the hyperlinks using an annotation mechanism.

8. The method as defined in claim 7, further comprising, for the contents each sub-page, extracting any style information from the markup language tag tree of the web page for inclusion in the sub-page.

9. One or more computer-readable storage media having computer-readable instructions thereon which, when executed by one or more processors, cause the one or more processors to implement the method of claim 7.

* * * * *